United States Patent
Sibbach

(10) Patent No.: US 12,331,652 B2
(45) Date of Patent: Jun. 17, 2025

(54) FAN BLADE ASSEMBLY WITH MIDSPAN SHROUD

(71) Applicant: General Electric Company, Schenectady, NY (US)

(72) Inventor: Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/484,429

(22) Filed: Sep. 24, 2021

(65) Prior Publication Data

US 2023/0096351 A1 Mar. 30, 2023

(51) Int. Cl.
*F01D 5/14* (2006.01)
*F02C 9/00* (2006.01)

(52) U.S. Cl.
CPC .............. *F01D 5/141* (2013.01); *F02C 9/00* (2013.01); *F05D 2220/36* (2013.01); *F05D 2260/70* (2013.01)

(58) Field of Classification Search
CPC . F01D 5/141; F01D 5/146; F01D 7/00; F02K 1/66; F02K 3/06; F02C 9/00; B64C 11/32; F04D 29/323; F04D 29/388; F05D 2220/36; F05D 2240/30; F05D 2260/70
See application file for complete search history.

(56) References Cited

U.S. PATENT DOCUMENTS

| | | | | |
|---|---|---|---|---|
| 3,467,198 A * | 9/1969 | Ellinger | .................... | F02K 3/06 |
| | | | | 416/157 R |
| 3,472,321 A | 10/1969 | Ellinger | | |
| 3,549,272 A * | 12/1970 | Bouiller | ............... | F04D 19/022 |
| | | | | 415/199.5 |
| 3,996,668 A | 12/1976 | Sharon | | |
| 4,012,165 A | 3/1977 | Kraig | | |
| 4,995,786 A | 2/1991 | Wheeler et al. | | |
| 5,275,531 A * | 1/1994 | Roberts | .................... | F01D 11/12 |
| | | | | 415/173.1 |
| 5,281,087 A | 1/1994 | Hines | | |
| 6,039,542 A | 3/2000 | Schilling et al. | | |
| 9,506,353 B2 * | 11/2016 | Schwarz | ............... | F04D 29/666 |
| 10,174,763 B1 * | 1/2019 | Orosa | .................... | F01D 5/146 |
| 10,273,976 B2 | 4/2019 | Jemora et al. | | |
| 10,436,213 B2 | 10/2019 | Grice | | |
| 10,472,978 B2 * | 11/2019 | Whurr | .................... | B64C 11/32 |
| 10,473,111 B2 | 11/2019 | Vetters | | |
| 10,563,513 B2 | 2/2020 | Kalitzin et al. | | |
| 11,149,552 B2 * | 10/2021 | DiPietro, Jr. | .......... | F01D 5/141 |
| 2010/0260591 A1 | 10/2010 | Martin et al. | | |
| 2015/0377036 A1 * | 12/2015 | Schwarz | ................. | F01D 25/24 |
| | | | | 29/889.7 |
| 2017/0159462 A1 * | 6/2017 | Whurr | ....................... | F02K 3/06 |
| 2018/0363481 A1 | 12/2018 | Bailey | | |
| 2020/0018320 A1 | 1/2020 | Vetters | | |
| 2023/0258092 A1 * | 8/2023 | Kray | ......................... | F02K 3/06 |
| | | | | 416/204 R |

* cited by examiner

*Primary Examiner* — Sang K Kim

(74) *Attorney, Agent, or Firm* — Dority & Manning, P.A.

(57) ABSTRACT

An engine includes a fan section including a plurality of fan blade assemblies. A fan blade assembly includes a midspan shroud separating an inner portion and an outer portion of the fan blade assembly. An outer pitch of the outer portion is variable with respect to an inner pitch of the inner portion.

17 Claims, 3 Drawing Sheets

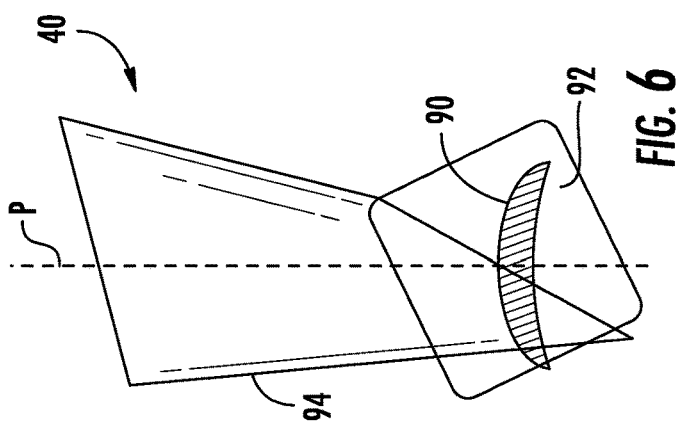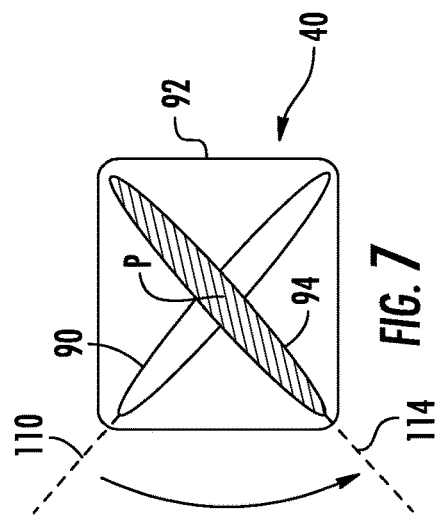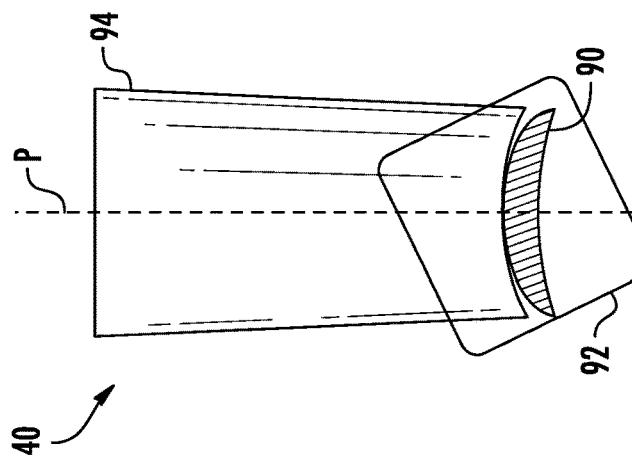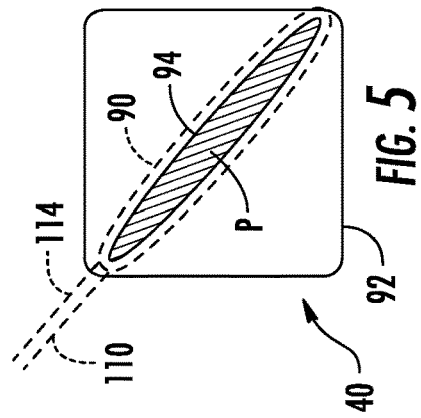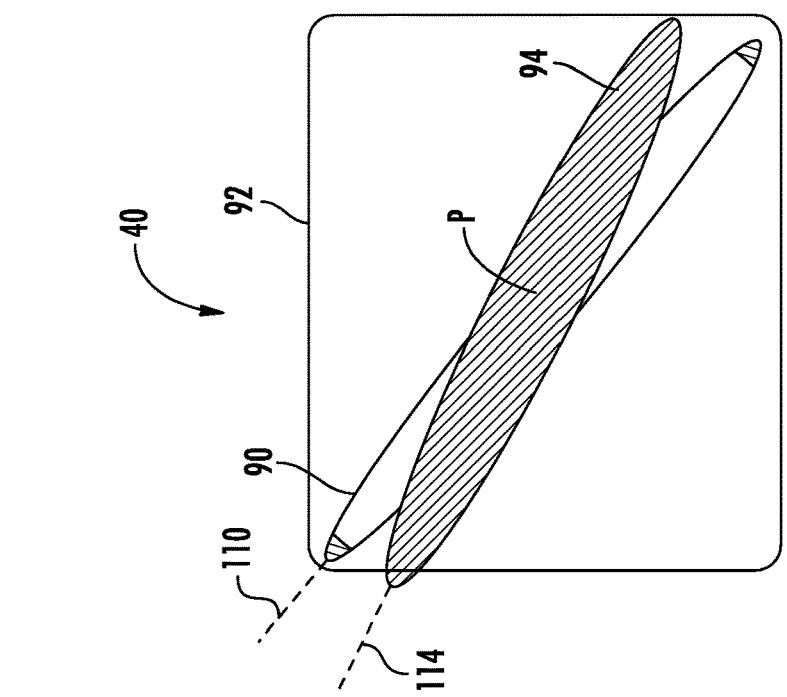

FAN BLADE ASSEMBLY WITH MIDSPAN SHROUD

FIELD

The present disclosure relates to a fan blade assembly, such as a fan blade assembly for a variable pitch fan of an engine.

BACKGROUND

A gas turbine engine generally includes a turbomachine and a rotor assembly. Gas turbine engines, such as turbofan engines, may be used for aircraft propulsion. Certain turbofan engines include a fan configured to generate forward thrust during a flight operation. During other operations, the fan may be configured to generate a reverse thrust to, e.g., slow down an aircraft incorporating the turbofan engine during a landing operation. Improvements to the fan of the turbofan engine to facilitate reverse thrust would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 3 is an end view of a fan blade assembly of the fan section of FIG. 2, in accordance with an exemplary aspect of the present disclosure.

FIG. 4 is a perspective view of a fan blade assembly of the fan section of FIG. 2, in accordance with an exemplary aspect of the present disclosure.

FIG. 5 is an end view of the fan blade assembly of FIG. 4, in accordance with an exemplary aspect of the present disclosure.

FIG. 6 is a perspective view of a fan blade assembly of the fan section of FIG. 2, in accordance with an exemplary aspect of the present disclosure.

FIG. 7 is an end view of the fan blade assembly of FIG. 6, in accordance with an exemplary aspect of the present disclosure.

DETAILED DESCRIPTION

Figure 2:
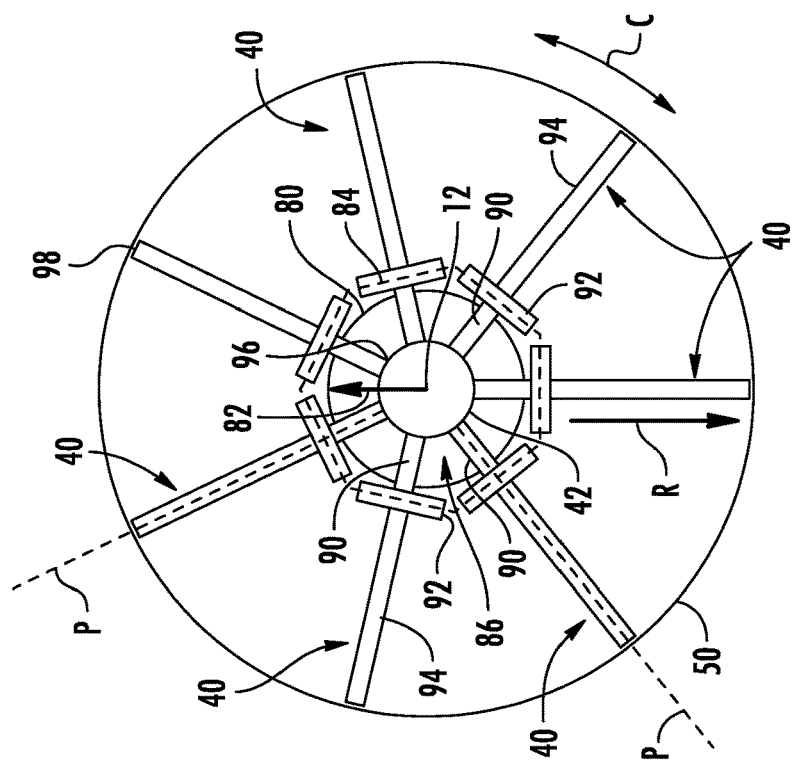
FIG. 2 is a schematic front-end view of a fan section of the gas turbine engine of FIG. 1, in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, regarding a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source.

Example gas turbine engines include turbofan engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The present disclosure is generally related to a fan blade assembly. More particularly, the present disclosure is related to a fan blade assembly including a midspan shroud, and a gas turbine engine including the same.

The midspan shroud separates an inner portion of the fan assembly from an outer portion of the fan assembly. For example, a midspan plane defined by the midspan shroud may be orthogonal to an inner plane defined by the inner portion and an outer plane defined by the outer portion. Additionally or alternatively, the midspan plane may align along a circumferential direction of the gas turbine engine and may be orthogonal to a radial direction of the gas turbine engine.

The gas turbine engine includes turbomachine. The turbomachine includes an outer casing defining a first upstream end, for example, at a first inlet to a core air flowpath through the turbomachine. The outer casing at least partially separates a bypass airflow passage and a core air flowpath.

The midspan shroud may be aligned with the first upstream end of the outer casing. In particular, the midspan shroud may at least partially define the bypass airflow passage and the core air flowpath. The engine may include a plurality of fan blade assemblies, each including a respective midspan shroud. The plurality of midspan shrouds may define a cylindrical shape defining a second inlet and a second upstream end and extending the upstream inlet location of the bypass airflow passage and the core air passage.

The second inlet is upstream of the first inlet and the second upstream end is upstream of the first upstream end to extend the upstream inlet location of the bypass airflow passage and the core air passage. For example, the second upstream end is upstream of the fan. The plurality of midspan shrouds operate to separate the bypass airflow passage and the core air flowpath.

The fan blade assembly may be part of a fan further including at least one actuator that is operatively coupled to an inner portion of the fan blade assembly, an outer portion of the fan blade assembly, or both to control a pitch of the inner portion, a pitch of the outer portion, or both. In certain configurations, the at least one actuator may be configured to vary the pitch of the outer portion relative to the pitch of the inner portion during various operating conditions of the gas turbine engine.

For example, during a reverse thrust operation, the at least one actuator may be configured to move the outer portion to a reverse thrust pitch while the inner portion is in a forward thrust pitch. Such may allow the fan blade assembly to continue to provide a desired airflow to a turbomachine of the gas turbine engine (e.g., to ensure it does not stall out) during the reverse thrust operation, while still generating a reverse thrust for the gas turbine engine.

Figure 1:
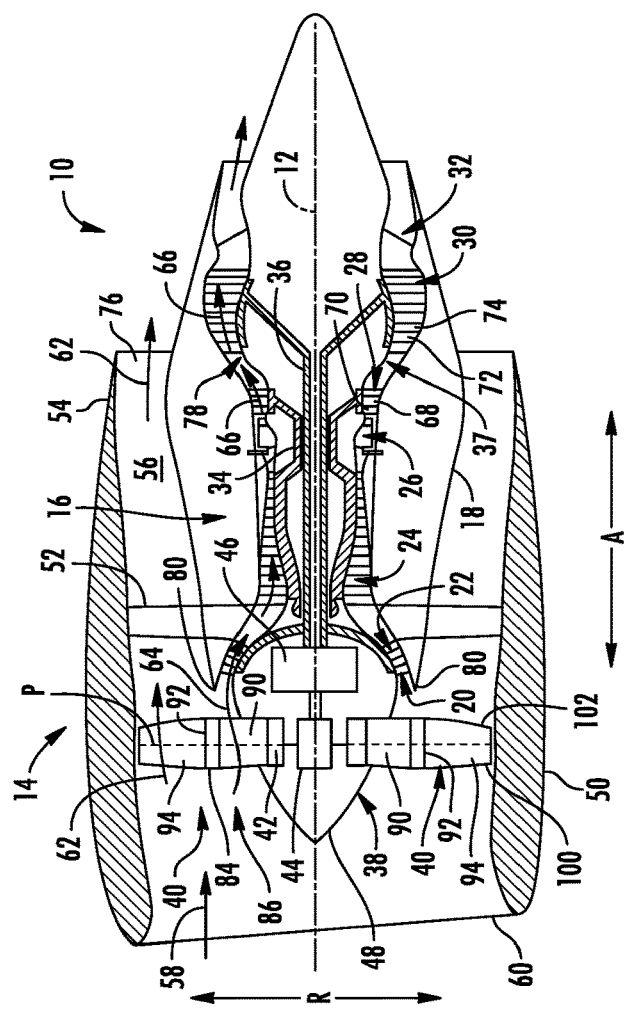
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, turbofan engine 10, configured to be mounted to an aircraft, such as in an under-wing configuration or tail-mounted configuration.

As shown in FIG. 1, the turbofan engine 10 defines an axial direction A (extending parallel to a longitudinal centerline 12 provided for reference), a radial direction R, and a circumferential direction C (i.e., a direction extending about the axial direction A; see FIG. 2).

In general, the turbofan engine 10 includes a fan section 14 and a turbomachine 16 disposed downstream from the fan section 14. The turbomachine 16 is sometimes also, or alternatively, referred to as a "core turbine engine".

The exemplary turbomachine 16 includes an outer casing 18 that defines a first inlet 20. The outer casing 18 may be substantially tubular and the first inlet 20 may be annular. The outer casing 18 encases, in serial flow relationship: a compressor section including a first, booster or low pressure (LP) compressor 22 and a second, high pressure (HP) compressor 24; a combustion section including a combustor 26; a turbine section including a first, high pressure (HP) turbine 28 and a second, low pressure (LP) turbine 30; and a jet exhaust nozzle section 32.

A high pressure (HP) shaft 34 or spool drivingly connects the HP turbine 28 to the HP compressor 24. A low pressure (LP) shaft 36 or spool drivingly connects the LP turbine 30 to the LP compressor 22. The compressor section, combustion section, turbine section, and jet exhaust nozzle section 32 are arranged in serial flow order and together define a core air flowpath 37 through the turbomachine 16.

The fan section 14 includes a variable pitch, single stage fan 38. The turbomachine 16 is operably coupled to and drives the fan 38.

The fan 38 includes a plurality of fan blade assemblies 40 coupled to a disk 42 in a spaced apart manner. As depicted, the fan blade assemblies 40 extend outwardly from disk 42 generally along the radial direction R.

As described in further detail below, the fan blade assemblies 40 are operatively coupled to one or more suitable actuators 44 and are rotatable.

The fan blade assemblies 40, disk 42, and actuators 44 are together rotatable about the longitudinal centerline 12 by the LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

During operation of the turbofan engine 10, the fan 38 defines a fan pressure ratio. As used herein, the term "fan pressure ratio" refers to a ratio of an air pressure immediately downstream of the fan 38 to an air pressure immediately upstream of the fan 38.

The disk 42 is covered by a rotatable front nacelle 48 aerodynamically contoured to promote an airflow through the plurality of fan blade assemblies 40. Additionally, the exemplary fan section 14 may include an annular fan casing or outer nacelle 50 that at least partially, and for the embodiment depicted, circumferentially, surrounds the fan 38 and at least a portion of the turbomachine 16. In other embodiments, a turbofan engine is an open rotor engine and the outer nacelle 50 is omitted.

Moreover, for the embodiment depicted, the outer nacelle 50 is supported relative to the turbomachine 16 by a plurality of circumferentially-spaced outlet guide vanes 52. A downstream section 54 of the outer nacelle 50 extends over an outer portion of the turbomachine 16 to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blade assemblies 40, a first portion of the air 58, a bypass airflow 62, is directed or routed into the bypass airflow passage 56 and a second portion of the air 58, a core airflow 64, is directed or routed into the core air flowpath 37.

The pressure of the core airflow 64 is increased as it is routed through the LP compressor 22 and the HP compressor 24 and into the combustor 26. More specifically, the compressor section, including the LP compressor 22 and HP compressor 24, defines an overall pressure ratio during operation of the turbofan engine 10 at a rated speed. The overall pressure ratio refers to a ratio of an exit pressure of the compressor section (i.e., a pressure of the core airflow 64 at an aft end of the compressor section) to an inlet pressure of the compressor section (i.e., a pressure of the core airflow 64 at the first inlet 20 to the compressor section).

The compressed core airflow 64 from the compressor section mixes with fuel and is burned within the combustion section to provide combustion gases 66. The combustion gases 66 are routed from the combustor 26, through the HP turbine 28 where a first portion of thermal and/or kinetic energy from the combustion gases 66 is extracted via sequential stages of HP turbine stator vanes 68 that are coupled to the outer casing 18 and a plurality of HP turbine rotor blades 70 that are coupled to the HP shaft 34, thus causing the HP shaft 34 to rotate, thereby supporting operation of the HP compressor 24.

The combustion gases 66 are then routed through the LP turbine 30 where a second portion of thermal and/or kinetic energy is extracted from the combustion gases 66 via sequential stages of LP turbine stator vanes 72 that are coupled to the outer casing 18 and a plurality of LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the bypass airflow 62 is substantially increased as the bypass airflow 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated that the exemplary turbofan engine 10 depicted in FIG. 1 is by way of example only, and that in other exemplary embodiments, the turbofan engine 10 may have any other suitable configuration. Aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as any aeroderivative gas turbine engine, such as a nautical gas turbine engine.

Other gas turbine engines to which the present disclosure may be applied may have alternative configurations. By way of example such engines may have an alternative number of interconnecting shafts (e.g., two) and/or an alternative number of compressors and/or turbines. Further the engine may include a gearbox provided in the drive train from a turbine to a compressor and/or fan.

It should be appreciated that the exemplary turbofan engine 10 depicted in FIG. 1 is by way of example only, and that in other exemplary embodiments, the turbofan engine 10 may have any other suitable configuration. For example, aspects of the present disclosure may be utilized with any other suitable aeronautical gas turbine engine, such as a turboshaft engine, turboprop engine, turbojet engine, etc. Further, aspects of the present disclosure may further be utilized with any aeroderivative gas turbine engine, such as a nautical gas turbine engine.

Other gas turbine engines to which the present disclosure may be applied may have alternative configurations. By way of example such engines may have an alternative number of interconnecting shafts (e.g., two) and/or an alternative number of compressors and/or turbines. Further the engine may not include a gearbox provided in the drive train from a turbine to a compressor and/or fan, may be configured as an unducted gas turbine engine (e.g., excluding the outer nacelle 50), etc.

Referring now also to FIG. 2, providing a schematic, front end view of the fan section 14 of FIG. 1, a first upstream end 80 of the outer casing 18 of the turbomachine 16 is positioned at a radial distance 82 from the longitudinal centerline 12. The first upstream end 80 defines a point of separation of the bypass airflow passage 56 and the core air flowpath 37. The outer casing 18 at least partially defines and directs the bypass airflow 62 (e.g., a first portion of the air 58) into the bypass airflow passage 56 and the core airflow 64 (e.g., a second portion of the air 58) into the core air flowpath 37.

Each fan blade assembly 40 includes an inner portion 90 along the radial direction R, a midspan shroud 92, and an outer portion 94 along the radial direction R. The midspan shroud 92 is aligned (e.g., the radial distance from the longitudinal centerline 12 to the midspan shroud 92 is equal to radial distance 82) with the first upstream end 80 of the outer casing 18.

Referring to FIG. 2, it will be appreciated that the fan section 14 includes a plurality of fan blade assemblies 40, with each fan blade assembly 40 including a midspan shroud 92, respectively. The midspan shrouds 92 of the fan blade assemblies 40 together have a cylindrical shape that extends the first upstream end 80 of the first inlet 20 (e.g., the cylindrical shape includes a second upstream end 84 (e.g., upstream ends of the midspan shrouds 92) of a second inlet 86 upstream of the first upstream end 80 and first inlet 20), extends an upstream end of and/or at least partially defines the bypass airflow passage 56, and extends an upstream end of and/or at least partially defines the core air flowpath 37. Alternatively described, the midspan shrouds 92 separate the air 58 entering the inlet 60 at or upstream of the fan 38 to isolate the bypass airflow 62 and the core airflow 64 before the bypass airflow 62 and core airflow 64 flow into the bypass airflow passage 56 and the core air flowpath 37, respectively.

The midspan shroud 92 separates the inner portion 90 from the outer portion 94. Referring to FIG. 2, a length or distance from a root 96 of the fan blade assembly 40 to a tip 98 of the fan blade assembly 40 may be referred to as the span of the fan blade assembly 40. Referring to FIG. 1, a width or distance between edges 100, 102 of the fan blade assembly 40 may be referred to as the chord of the fan blade assembly 40.

The midspan shroud 92 may be positioned closer to the root 96 than the tip 98 along the span of the fan blade assembly 40. A midspan plane of the midspan shroud 92 may be substantially orthogonal to an inner plane of the inner portion 90 and to an outer plane of the outer portion 94 (not labeled).

As described above with respect to the fan blade assemblies 40, the inner portions 90 along the radial direction R and/or the outer portions 94 along the radial direction R are operatively coupled to one or more actuators 44. For example, the actuators 44 may be configured to (collectively or independently) vary the pitch of the inner portions 90 and/or the outer portions 94 (e.g., rotate around a pitch axis P).

Referring to FIGS. 3, 5, and 7, each providing an end view of the fan blade assembly 40 of the fan section 14 of FIG. 2 in accordance with an exemplary aspect of the present disclosure, an outer pitch 114 of the outer portion 94 may be varied with respect to an inner pitch 110 of the inner portion 90. For example, each of the inner pitch 110 and the outer pitch 114 is variable. As another example, the inner pitch 110 may be fixed and the outer pitch 114 may be variable. Referring particularly to FIG. 3, outer pitch 114 and inner pitch 110 are illustrated at different forward pitch angles.

As the bypass airflow 62 and the core airflow 64 can be independently adjusted, the bypass ratio may be adjusted. The ratio between an amount of bypass airflow 62 through the bypass airflow passage 56 (i.e., the first portion of air 58) to an amount of core airflow 64 through the core air flowpath 37 (i.e., the second portion of air 58) is known as a bypass ratio. For example, referring now particularly to FIGS. 3, and 5, the configuration of FIG. 3 may have a different bypass ratio than the configuration of FIG. 5 as the pitches 110, 114 of the radially inner portions 90 and the radially outer portion 94 are different in FIG. 3 and the pitches 110, 114 are the same in FIG. 5.

Referring now particularly to FIGS. 5 and 7, as well as now also to FIGS. 4 and 6, each providing a perspective view of the fan blade assembly 40 of the fan section 14 of FIG. 2 in accordance with an exemplary aspect of the present disclosure, according to an exemplary method, the actuators 44 may shift the outer pitch 114 of the outer portion 94 to a reverse pitch angle while maintaining the inner pitch 110 of the inner portion 90 at a forward pitch angle. In FIGS. 4-5, the outer pitch 114 and the inner pitch 110 are the same or similar and each represent a forward pitch angle (e.g., a forward thrust operating mode). FIG. 5 illustrates an end view of the fan blade assembly 40 looking at the tip 98 and FIG. 4 is a perspective view of the fan blade assembly 40.

Referring to FIGS. 6-7, the outer portion 94 is rotated such that the outer pitch 114 is at a reverse pitch angle and inner pitch 110 of the inner portion 90 remains the forward pitch angle. In this configuration (e.g., a reverse thrust operating mode), the inner portion 90 is maintained in a forward pitch to maintain the core airflow 64 in the forward direction when the bypass airflow 62 is in the reverse direction due to the reverse pitch of the outer portion 94.

This minimizes the issue of starvation of core airflow 64 to the turbomachine 16 during a reverse thrust operation. The inner portion 90 maintains some flow in the forward direction to the core air flowpath 37 and, as the midspan shroud 92 separates the core airflow 64 from the bypass airflow 62, there is less disruption between the airflows 62, 64 when moving in different directions.

It will be appreciated, that as used herein, the term "forward pitch angle" of a rotor blade refers to a pitch angle of the rotor blade whereby the rotor blade is configured to provide an airflow from a forward location to an aft location to, e.g., generate forward thrust. By contrast, as used herein, the term "reverse pitch angle" of a rotor blade refers to a pitch angle of the rotor blade whereby the rotor blade is configured to provide an airflow from an aft location to a forward location to, e.g., generate reverse thrust.

Figure 8:
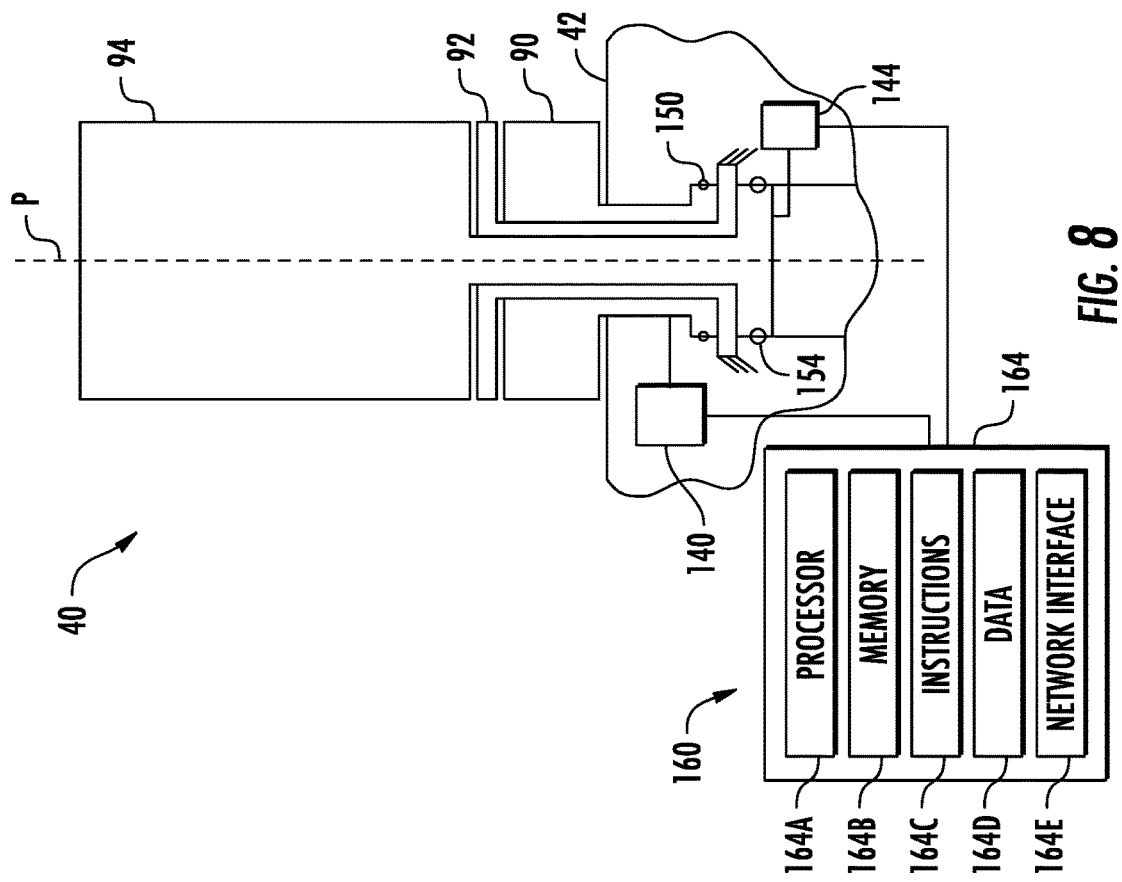
FIG. 8 is a schematic illustration of a fan blade assembly, in accordance with the present disclosure.

Referring to FIG. 8, providing a schematic illustration of a fan blade assembly 40, in accordance with the present disclosure, the fan blade assembly 40 includes a first actuator 140 that is operatively coupled to the inner portion 90 and a second actuator 144 that is operatively coupled to the outer portion 94 of the fan blade. Here, the midspan shroud 92 is fixed in place (e.g., fixed to the disk 42) and the inner portion 90 and the outer portion 94 are rotatable with respect to the disk 42 or other structure of the engine.

For example, bearings 150, 154 are configured to allow the inner portion 90 and the outer portion 94 to rotate. The first actuator 140 controls a pitch of the inner portion 90 around the pitch axis P and the second actuator 144 controls a pitch of the outer portion 94 around the pitch axis P.

Figure 9:
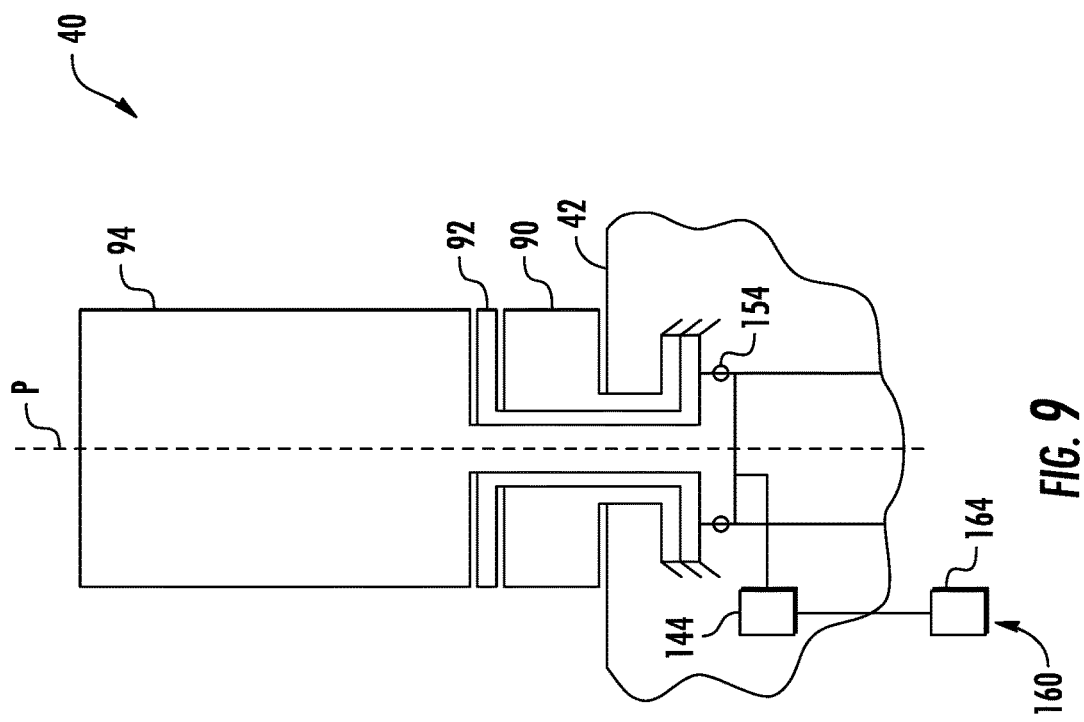
FIG. 9 is a schematic illustration of a fan blade assembly, in accordance with the present disclosure.

Referring to FIG. 9, providing a schematic illustration of a fan blade assembly 40, in accordance with the present disclosure, the fan blade assembly 40 includes the second actuator 144 that is operatively coupled to the outer portion 94 of the fan blade. Here, the inner portion 90 and the midspan shroud 92 are fixed in place (e.g., fixed to the disk 42). The outer portion 94 is rotatable with respect to the disk 42 or other structure of the engine. For example, bearing 154 is configured to allow the outer portion 94 to rotate. The second actuator 144 controls a pitch of the outer portion 94 around the pitch axis P.

A controller 160 is configured to control one or more of actuators 140, 144 to vary the pitch or pitch position of the outer portion 94 relative to the pitch of the inner portion 90 during various operating conditions of the turbofan engine 10. For example, according to a reverse thrust operation, the controller 160 is configured to control the second actuator 144 to move the outer portion 94 to a reverse pitch position (e.g., a pitch producing reverse thrust) while the inner portion 90 is in a forward pitch position (e.g., a pitch producing forward thrust). To be in a forward pitch position, the inner portion 90 may have a fixed forward pitch or the controller 160 may control the first actuator 140 to move the inner portion 90 to a forward pitch position.

This configuration allows the fan blade assembly 40 to continue to provide a desired airflow to the turbomachine 16 of the turbofan engine 10 (e.g., to ensure it does not stall out) during the reverse thrust operation, while still generating a reverse thrust for the turbofan engine 10.

The controller 160 may control the actuators 140, 144 to independently control the pitch of the inner portion 90 and the outer portion 94 to have a forward pitch and generate a forward thrust or airflow or to have a reverse pitch and generate a reverse thrust or airflow.

In general, the exemplary controller 160 is configured to receive the data or commands (e.g., a mode command) received from one or more systems and, e.g., make control decisions based on the received data.

In one or more exemplary embodiments, the controller 160 may be a stand-alone controller, or alternatively, may be integrated into one or more of a controller for the turbofan engine 10, a controller for an aircraft including the turbofan engine 10, etc.

Referring particularly to the operation of the controller 160, in at least certain embodiments, the controller 160 can include one or more computing device(s) 164. The one or more computing device(s) 164 can include one or more processor(s) 164A and one or more memory device(s) 164B.

The one or more processor(s) 164A can include any suitable processing device, such as a microprocessor, microcontroller, integrated circuit, logic device, and/or other suitable processing device.

The one or more memory device(s) 164B can include one or more computer-readable media, including, but not limited to, non-transitory computer-readable media, RAM, ROM, hard drives, flash drives, and/or other memory devices. The one or more memory device(s) 164B can store information accessible by the one or more processor(s) 164A, including computer-readable instructions 164C that can be executed by the one or more processor(s) 164A. The instructions 164C can be any set of instructions that when executed by the one or more processor(s) 164A, cause the one or more processor(s) 164A to perform operations. In some embodiments, the instructions 164C can be executed by the one or more processor(s) 164A to cause the one or more processor(s) 164A to perform operations, such as any of the operations and functions for which the controller 160 and/or the one or more computing device(s) 164 are configured, the operations for operating the turbofan engine 10 (e.g., modes or methods), as described herein, and/or any other operations or functions of the one or more computing device(s) 164.

The instructions 164C can be software written in any suitable programming language or can be implemented in hardware. Additionally, and/or alternatively, the instructions 164C can be executed in logically and/or virtually separate threads on the one or more processor(s) 164A.

The one or more memory device(s) 164B can further store data 164D that can be accessed by the one or more processor(s) 164A. For example, the data 164D can include data indicative of power flows, data indicative of engine/aircraft operating conditions, and/or any other data and/or information described herein.

The one or more computing device(s) 164 can also include a network interface 164E used to communicate, for example, with the other components of the turbofan engine 10, the aircraft incorporating the gas turbine engine, etc. For example, in the embodiment depicted, the turbofan engine 10 may operate in several modes of operation. The controller 160 is operably coupled to the one or more aircraft systems (e.g., a flight management system or other aircraft control system) through, e.g., the network interface, such that the controller 160 may receive data or commands indicative of various modes.

The network interface 164E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining a radial direction, comprising: a fan comprising a fan blade assembly, the fan blade assembly comprising: an inner portion along the radial direction; a midspan shroud; and an outer portion along the radial direction; and at least one actuator that is operatively coupled to the inner portion, the outer portion, or both to control an inner pitch of the inner portion, an outer pitch of the outer portion, or both.

The gas turbine engine of one or more of these clauses, wherein the at least one actuator is operatively coupled to the outer portion, wherein the inner portion has a fixed forward pitch, and wherein the outer portion has a variable pitch.

The gas turbine engine of one or more of these clauses, wherein the outer portion is moveable between a forward pitch position and a reverse pitch position by the at least one actuator.

The gas turbine engine of one or more of these clauses, wherein the at least one actuator is configured to vary the outer pitch of the outer portion relative to the inner pitch of the inner portion.

The gas turbine engine of one or more of these clauses, wherein each of the inner portion and the outer portion has a variable pitch.

The gas turbine engine of one or more of these clauses, wherein the midspan shroud separates the inner portion from the outer portion.

The gas turbine engine of one or more of these clauses, wherein the midspan shroud is closer to a root of the fan blade assembly than a tip of the fan blade assembly.

The gas turbine engine of one or more of these clauses, wherein a midspan plane of the midspan shroud is orthogonal to an inner plane of the inner portion and to an outer plane of the outer portion.

The gas turbine engine of one or more of these clauses, wherein the midspan shroud at least partially defines at least one of a bypass airflow passage and a core air flowpath.

The gas turbine engine of one or more of these clauses, further comprising: a turbomachine drivingly coupled with the fan, the turbomachine comprising an outer casing defining a first upstream end and a first inlet to a core air flowpath, wherein a bypass airflow passage and the core air flowpath are separated at least by the outer casing.

The gas turbine engine of one or more of these clauses, wherein the midspan shroud is aligned with the first upstream end.

The gas turbine engine of one or more of these clauses, wherein the first upstream end is positioned at a first radial distance from a longitudinal centerline of the gas turbine engine, wherein the midspan shroud is positioned at a second radial distance from the longitudinal centerline of the gas turbine engine, and wherein the first radial distance is substantially equal to the second radial distance.

The gas turbine engine of one or more of these clauses, wherein the fan comprises a plurality of fan blade assemblies, wherein each of the plurality of fan blade assemblies comprises a respective midspan shroud, and wherein the midspan shrouds of the plurality of fan blade assemblies together define a cylindrical shape including a second inlet that is upstream of the first inlet to the core air flowpath.

The gas turbine engine of one or more of these clauses, wherein the midspan shrouds separate the bypass airflow passage and the core air flowpath.

A fan blade assembly for a gas turbine engine defining a radial direction, the fan blade assembly comprising: an inner portion along the radial direction of the gas turbine engine when installed in the gas turbine engine, the inner portion defining an inner pitch; an outer portion along the radial direction of the gas turbine engine when installed in the gas turbine engine, the outer portion defining an outer pitch, wherein the outer portion is rotatable relative to the inner portion such that the outer pitch is variable relative to the inner pitch; and a midspan shroud positioned between the inner portion and the outer portion.

The fan blade assembly of one or more of these clauses, wherein the inner portion has a fixed forward pitch, and wherein the outer portion has a variable pitch.

The fan blade assembly of one or more of these clauses, wherein the midspan shroud separates the inner portion from the outer portion.

The fan blade assembly of one or more of these clauses, wherein the midspan shroud is closer to a root of the fan blade assembly than a tip of the fan blade assembly.

The fan blade assembly of one or more of these clauses, wherein a midspan plane of the midspan shroud is orthogonal to an inner plane of the inner portion and to an outer plane of the outer portion.

A method of operating a gas turbine engine having a fan with a fan blade, the method comprising: operating the gas turbine engine in a forward thrust operating mode; and operating the gas turbine engine in a reverse thrust operating mode, wherein operating the gas turbine engine in the reverse thrust operating mode comprises changing an outer pitch of an outer portion of the fan blade relative to an inner pitch of an inner portion of the fan blade, wherein a midspan shroud separates the inner portion from the outer portion.

I claim:

1. A gas turbine engine defining a radial direction, comprising:
   a fan comprising a plurality of fan blade assemblies, each of the plurality of fan blade assemblies comprising:
     an inner portion along the radial direction;
     a midspan shroud; and
     an outer portion along the radial direction; and
   at least one actuator operatively coupled to the inner portion, the outer portion, or both to control an inner pitch of the inner portion, an outer pitch of the outer portion, or both;
   a turbomachine drivingly coupled with the fan, the turbomachine comprising an outer casing defining a first upstream end and a first inlet to a core air flowpath, wherein a bypass airflow passage and the core air flowpath are separated at least by the outer casing,
   wherein the midspan shrouds of the plurality of fan blade assemblies together include a second inlet that is upstream of the first inlet to the core air flowpath;
   wherein the first upstream end and the midspan shroud define a separation between the bypass airflow passage and the core air flowpath;
   wherein the midspan shrouds are spaced circumferentially from one another; and
   wherein each of the inner portion and the outer portion has a variable pitch.

2. The gas turbine engine of claim 1, wherein the at least one actuator is operatively coupled to the outer portion.

3. The gas turbine engine of claim 2, wherein the outer portion is moveable between a forward pitch position and a reverse pitch position by the at least one actuator.

4. The gas turbine engine of claim 1, wherein the at least one actuator is configured to vary the outer pitch of the outer portion relative to the inner pitch of the inner portion.

5. The gas turbine engine of claim 1, wherein the midspan shroud separates the inner portion from the outer portion.

6. The gas turbine engine of claim 1, wherein the midspan shroud is closer to a root of the fan blade assembly than a tip of the fan blade assembly.

7. The gas turbine engine of claim 1, wherein a midspan plane of the midspan shroud is orthogonal to a pitch axis aligned with both the inner portion and the outer portion.

8. The gas turbine engine of claim 1, wherein the midspan shroud is aligned with the first upstream end.

9. The gas turbine engine of claim 1, wherein the first upstream end is positioned at a first radial distance from a longitudinal centerline of the gas turbine engine, wherein the midspan shroud is positioned at a second radial distance from the longitudinal centerline of the gas turbine engine, and wherein the first radial distance is equal to the second radial distance.

10. The gas turbine engine of claim 1, wherein each of the midspan shrouds of the plurality of fan blade assemblies includes first and second opposed edges, spaced apart from one another in a circumferential direction, on opposite sides of a pitch axis of the respective fan blade assembly.

11. The gas turbine engine of claim 10, wherein the midspan shrouds separate the bypass airflow passage and the core air flowpath.

12. The gas turbine engine of claim 1, wherein the midspan shroud of each fan blade is fixed relative to a pitch axis of the respective fan blade.

13. A fan blade assembly for a gas turbine engine defining a radial direction, the fan blade assembly comprising:
   an inner portion along the radial direction of the gas turbine engine, when installed in the gas turbine engine the inner portion defining an inner pitch;
   an outer portion along the radial direction of the gas turbine engine, when installed in the gas turbine engine the outer portion defining an outer pitch, wherein the outer portion is rotatable relative to the inner portion such that the outer pitch is variable relative to the inner pitch; and
   a midspan shroud positioned between the inner portion and the outer portion, wherein the midspan shroud includes first and second opposed edges, spaced apart from one another in a circumferential direction, on opposite sides of a pitch axis of the fan blade assembly, wherein the midspan shroud separates the inner portion from the outer portion, wherein each of the inner portion and the outer portion has a variable pitch.

14. The fan blade assembly of claim 13, wherein the midspan shroud separates the inner portion from the outer portion.

15. The fan blade assembly of claim 13, wherein the midspan shroud is closer to a root of the fan blade assembly than a tip of the fan blade assembly.

16. The fan blade assembly of claim 13, wherein a midspan plane of the midspan shroud is orthogonal to an inner plane of the inner portion and to an outer plane of the outer portion.

17. A method of operating a gas turbine engine having a fan with a fan blade assembly, the method comprising:
   operating the gas turbine engine in a forward thrust operating mode; and
   operating the gas turbine engine in a reverse thrust operating mode, wherein operating the gas turbine engine in the reverse thrust operating mode comprises changing an outer pitch of an outer portion of the fan blade assembly relative to an inner pitch of an inner portion of the fan blade assembly, wherein a midspan shroud separates the inner portion from the outer portion, wherein the midspan shroud includes first and second opposed edges, spaced apart from one another in a circumferential direction, on opposite sides of a pitch axis of the fan blade assembly, wherein a midspan plane of the midspan shroud is orthogonal to an inner plane of the inner portion and to an outer plane of the outer portion, wherein the midspan shrouds are spaced circumferentially from one another, wherein each of the inner portion and the outer portion has a variable pitch.

* * * * *